I. J. D. FAIRHURST.
COVER FOR PNEUMATIC TIRES.
APPLICATION FILED FEB. 28, 1907.
901,527.
Patented Oct. 20, 1908.
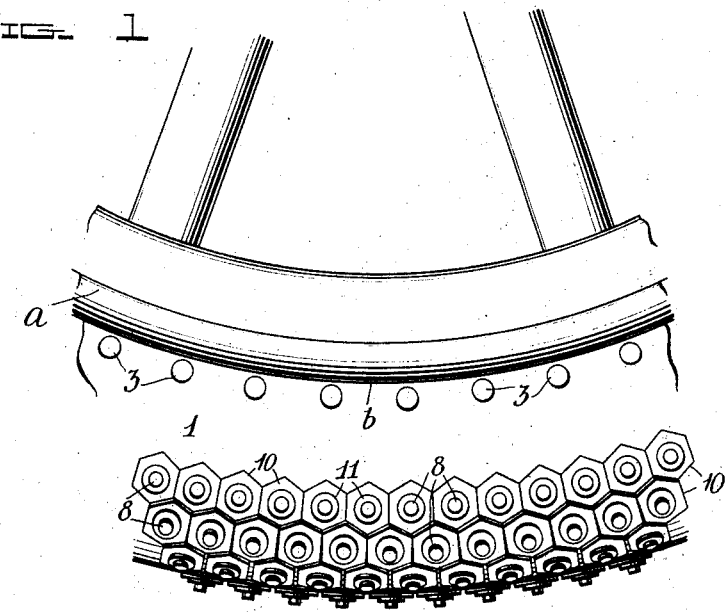
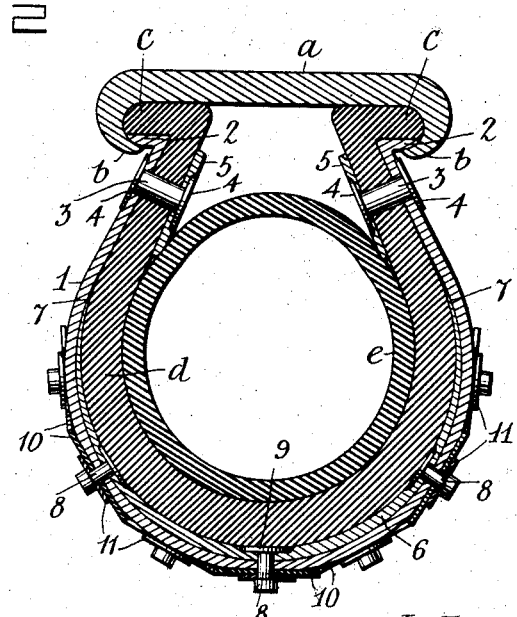
Witnesses
Inventor
I. J. D. Fairhurst
by Attorneys

UNITED STATES PATENT OFFICE.

ISAAC J. D. FAIRHURST, OF ORFORDVILLE, WISCONSIN.

COVER FOR PNEUMATIC TIRES.

No. 901,527.　　　Specification of Letters Patent.　　　Patented Oct. 20, 1908.

Application filed February 28, 1907. Serial No. 359,868.

*To all whom it may concern:*

Be it known that I, ISAAC J. D. FAIRHURST, a citizen of the United States, residing at Orfordville, in the county of Rock and State of Wisconsin, have invented certain new and useful Improvements in Covers for Pneumatic Tires; and I do declare the following to be a full, clear, and exact description of the invention, such as will enable others skilled in the art to which it appertains to make and use the same.

This invention is an improved cover and armor for the pneumatic tire of an automobile or other vehicle wheel and it consists in the construction, combination and arrangement of devices hereinafter described and claimed.

In the accompanying drawings,—Figure 1 is a side elevation of a portion of an automobile wheel provided with a pneumatic tire having my improved armored cover; and Fig. 2 is a transverse sectional view of the same on a larger scale.

The vehicle wheel rim is indicated at *a* and has a flange *b* to engage the flanges *c* at the edges of the outer tire *d*, in which the usual pneumatic or inflatable inner tire *e* is placed.

In accordance with my invention, I provide a cover 1 for the outer tire *d*, which cover is preferably made of rawhide or may be made of any other suitable tough, elastic material. The size of said cover 1 is such that it covers the entire outer surface of the outer tire *d* and its edges 2 bear on the flanges *c* of the outer tire and are clamped between said flanges and the flanges *b* of the wheel rim *a*, when the tire is fitted on the wheel, so that the said edges 2 are covered and concealed by the said flanges *b* of the wheel rim.
The said cover 1 is permanently secured near its said edges 2 to the outer tire *b*. For this purpose, I employ rivets 3, of which a suitable number are used, the said rivets being suitably spaced apart. The said rivets extend outwardly through the tire *d*, near its edges, and through the cover 1 at a suitable distance from the edges of said cover, and under the heads 4 of the said rivets, I place washers 5, which are preferably of quadrangular form and are made preferably of rawhide or other suitable tough, strong and elastic material. The said washers prevent the heads of the rivets from tearing or otherwise injuring the outer tire *d*, and they also serve to project outwardly beyond the edges of the rivet heads and form cushions around the rivet heads, which serve to partially embed the rivet heads, so that the latter are prevented from presenting projecting surfaces on the inner side of the outer tire, and hence said rivet heads are prevented from cutting or otherwise injuring the inner tire.

In the central or tread portion of the cover is a reinforcing strip 6 which is also preferably made of rawhide or other suitable tough, strong and elastic material. The said reinforcing strip covers the tread portion of the outer tire and is of suitable width, its sides terminating some distance short of the rivets 3, and its side edges being beveled to form feather edges 7, which prevent the said reinforcing strip from presenting shoulders or other uneven surfaces where they bear against the outer cover 1 and hence injury to the inner tire is prevented. The said reinforcing strip is secured to the cover 1 by means of rows of rivets 8, which rivets are disposed in annular circumferential series extending around the periphery of the wheel formed by the said cover 1 and a suitable number of the said annular series of rivets are employed according to the size of the tire and of the cover. The heads 9 of the rivets are embedded in the inner surface of the reinforcing strip 6. The shanks of the rivets extend through the outer cover 1 and project outwardly from said cover. Armor plates or washers 10 are placed on the shanks of the rivets and bear against the outer surface of the cover 1. Reinforcing anti-skidding washers 11 are placed on the said shanks and bear against the outer surfaces of said armor washers and the projecting outer ends of the rivet shanks are partially headed or upset to form shoulders which engage the said reinforcing washers 11 and hold the latter and hence also the armor washers in place. The partially headed rivets also form anti-slipping projections. The armor washers are polygonal in form and are of such size that they closely approach one another, so that each will prevent contiguous armor washers from turning on the rivets. The number of the rivets, the spaces between them and the size of the armor washers are such that the armor washers cover nearly all of the tread surface of the cover 1 and hence constitute an armor which effectually prevents the cover and the tire from being punctured. The rivets 8 with their washers 11 and armor washers 10 form projecting surfaces on the tread portion of the tire cover, which prevent the wheel from slipping and also effectually prevents skidding.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters-Patent is,—

A tire cover having a reinforcing strip in its tread portion, combined fastening and armor rivets securing said reinforcing strip to the cover and forming a protective armor on the outer side of the latter with abutting hexagonal plates secured on the projecting ends of said rivets, reinforcing anti-skidding washers arranged on said armor plates and washer retaining heads formed on the outer ends of said rivets, said heads also forming anti-slipping projections, substantially as described.

In testimony whereof I have hereunto set my hand in presence of two subscribing witnesses.

ISAAC J. D. FAIRHURST.

Witnesses:
ALFRED MYHIE,
MATH CANTINI.